United States Patent Office 3,060,133
Patented Oct. 23, 1962

3,060,133
PRODUCTION AND REGENERATION OF PLATINUM CARRIER CATALYSTS FOR THE SYNTHESIS OF HYDROXYLAMINE FROM NITRIC OXIDE AND HYDROGEN
Kurt Jockers, Ludwigshafen (Rhine), and Hermann Meier, Ludwigshafen (Rhine)-Gartenstadt, Germany, assignors to Badische Anilin- & Soda-Fabrik Aktiengesellschaft, Ludwigshafen (Rhine), Germany
No Drawing. Filed Apr. 5, 1960, Ser. No. 20,020
4 Claims. (Cl. 252—472)

This invention relates to a new process for the production and regeneration of platinum carrier catalysts for the catalytic reduction of nitric oxide with hydrogen to hydroxylamine in the presence of diluted mineral acid.

The reduction of nitric oxide to hydroxylamine salts is described in U.S. patent specification No. 2,628,889. U.S. patent specification No. 2,719,778 discloses how the space-time yields of this process can be increased by adding additives to the catalyst suspension. U.S. patent specification No. 2,798,791 discloses how the life of the platinum catalyst for the production of hydroxylamine sulfate can be prolonged by oxidizing the sulfuric acid prior to use. U.S. patent specification No. 2,823,101 discloses how by using partly poisoned platinum catalysts an undesirable hydrogenation of nitric oxide to ammonia can be substantially suppressed and the yields of hydroxylamine, with reference to the reacted nitric oxide, can thereby be substantially improved in spite of a reaction temperature of 45° C.

In the said patent specifications, platinum catalysts are used, usually in the form of so-called carrier catalysts, i.e. the finely-divided active platinum is situated on an inactive carrier.

In theory there may be used as carriers all suitable acidproof substances, as for example graphite, activated charcoal, kieselguhr or barium sulfate. In practice, finely divided graphite has proved to be especially suitable.

By reason of the prolonged influence of dilute mineral acid, such as hydrochloric acid or sulfuric acid, when hydrogen is present, the finely divided platinum of the catalyst has a very strong tendency to recrystallize. This leads to an undesirable decrease in the activity of the catalyst; in other words, the amount of NO reacted per gram of platinum per hour becomes continually smaller. In order to correct this defect, it is necessary to remove the catalyst from the apparatus at intervals of a few weeks in order to regenerate it.

All regeneration methods which rely for their effect on the removal of any kind of extraneous substances from the surface of the catalyst, as for example washing with dilute acids, washing with ammonium oxalate or heating with air or gases containing oxygen must be rejected. An effective regeneration is only possible when the active platinum is reprecipitated. For this purpose the catalyst must first be treated with a solvent for platinum. The use of aqua regia with simultaneous heating is especially suitable for this purpose. The platinum thereby passes into solution rapidly and quantitatively. The platinum can also be dissolved practically quantitatively by prolonged simultaneous action of hydrochloric acid and chlorine gas.

The quantitative dissolution of the platinum is very important; otherwise, when the platinum is reprecipitated, the metallic platinum residues still present act as nuclei upon which large platinum crystals are deposited, with the result that the activity of the supposedly regenerated catalyst is small from the start.

By filtering the resultant suspension of carrier and platinum solution and by carefully washing the carrier, the platinum solution and the carrier can be obtained separately.

In principle it is also possible to recover the platinum by other methods. Thus, when a graphite or activated charcoal is the carrier, it is possible by the action of air or oxygen-containing gases at elevated temperature, to burn the graphite or activated charcoal quantitatively. Furthermore, processes have been described in which, inversely to the above method, it is not the platinum but the carrier which is dissolved. This is possible for example by dissolving a carrier composed of aluminum oxide in caustic soda solution. Similarly, the platinum can be volatilized by the action of phosgene or aluminum chloride vapor and then separated again from the gas stream by condensation.

In view of the relative frequency with which platinum catalysts for the above-mentioned catalytic production of hydroxylamine have to be regenerated, the best and simplest process has proved to be that of dissolving the platinum with aqua regia.

In order to precipitate the platinum onto the carrier from a platinum solution there are in principle three ways possible.

A method often used for applying platinum or other precious metals to a carrier comprises evaporating the mixture of carrier and platinum solution to dryness and either destroying the platinum compounds by heating and thus depositing the platinum metal on the carrier, or treating the dry mass at elevated temperature with hydrogen or some other reducing gas.

A second method comprises first precipitating insoluble platinum compounds onto the carrier and then, if desired after filtering off the catalyst from the aqueous solution, decomposing these insoluble compounds by heat or reducing them by means of a relucing agent, as for example hydrogen. For example difficultly soluble ammonium platinum (IV) chloride may be precipitated on the carrier from chloroplatinic (IV) acid (U.S. patent specification No. 2,658,028). It is also possible to precipitate platinum sulfide on the carrier by the action of hydrogen sulfide (U.S. patent specification No. 2,767,147) or ammonium sulfide (British patent specification No. 736,632). The precipitation of platinum (II) hydroxide or platinum (II) hydrated oxide from sodium chloroplatinate (II) has also been described (British patent specifictaion No. 624,353).

These methods have not proved suitable for the catalytic synthesis of hydroxylamine from nitric oxide and hydrogen. The best catalysts for this puropse are obtained by choosing the third method of applying platinum to the carrier. In this method platinum is directly precipitated onto the carrier in metallic form from an aqueous solution by the action of reducing agents, as for example hydrogen, hydrazine, formaldehyde or formic acid. In the present case the best method has proved to be the reduction of the platinum salt solution from a medium which has been rendered weakly acid with formic acid.

Such a reduction is however strongly dependent on temperature, concentration of the platinum solution and nature and concentration of the solution components. This dependence is shown in the speed at which the platinum is deposited and especially in the size of the crystallites and the firmness of adhesion of the deposited active metal. Thus the activity and life of the catalysts can also be varied within certain limits by varying the precipitation conditions.

These are known facts. Even when the catalysts are not prepared by precipitating the platinum from aqueous medium by the action of reducing agents, the activity and life of the catalysts are still strongly dependent on the initial platinum compound. Thus processes for the production of catalysts have been described in which special effects are achieved by using as the platinum compound, for example, dichlorethylene platinum (II) (U.S. patent specification No. 2,861,960), platinum (II) tetrammine hydroxide (U.S. patent specification No. 2,834,740) or a solution of platinum sulfide in sulfuric or nitric acid (British patent specification No. 720,796).

No clearly defined platinum compound is formed by dissolving platinum in aqua regia. The platinum is partly present as chloroplatinic (IV) acid. There are also nitrogenous platinum compounds present in the solution. Unused aqua regia is also to be found in the solution, i.e. hydrochloric acid, nitric acid, nitrosyl chloride and oxides of nitrogen. In order to obtain clearly defined platinum compounds therefrom, protracted operations are often necessary. Thus for example chloroplatinic (IV) acid can only be prepared therefrom by repeatedly evaporating to dryness and then adding water and concentrated hydrochloric acid. It is almost impossible to carry out this operation in the presence of a carrier.

It should be pointed out that in almost all those processes for the production of platinum catalysts in which specific initial platinum compounds are used, such as chloroplatinic (IV) acid, sodium chloroplatinate (II), tetramminoplantinum (II) hydroxide, dichloroethylene platinum (II), barium platinocyanide, ammonium platinonitrate and the like, it is necessary in the regeneration of the catalyst to separate the platinum from the carrier entirely and then to work it up by known chemical processes to clearly defined platinum compounds. Every expert knows that many of these methods are very difficult and that it is always necessary to tolerate a certain loss of platinum, above all during the separation of the carrier from the platinum. As already mentioned, the platinum catalysts for the synthesis of hydroxylamine from nitric oxide and hydrogen must be regenerated relatively frequently. Consequently it is extremely important that a simple and cheap process for regeneration should be found. It was already known that a complete detachment of the platinum from the carrier was necessary. However, there should certainly be no need to separate the carrier from the platinum solution obtained.

In order to achieve the complete detachment of the platinum from the carrier the acids should be used in at least a certain minimum concentration. Otherwise, apart from the fact that the platinum in the resultant solution is not present as a definite unitary compound, the solution still has a relatively high concentration of unused acids.

Attempts, after previous neutralization of excess acids, to precipitate the platinum from this solution, for example with formic acid, formates or hydrogen from a weakly acid medium or in the presence of buffer substances, led, in spite of variations of all the experimental conditions, only to short-lived catalysts whose initial activity declined very rapidly. Investigations showed that the finely divided platinum had only poor adhesive power and that the crystallite size of the platinum was very large from the start.

The reduction of the platinum compounds proceeded very slowly and was not quantitative until after a long period.

It has been recognized that the cause of this was not only the non-uniformity of the platinum compound but also the high concentration of neutral salts in the neutralized platinum solution.

In the resultant solution, the platinum is present in complex combination. It is a known fact that the stability of complexes can be varied to a very great extent by varying the solution components.

We have now found that from the said platinum solutions it is possible to obtain very good catalysts with high initial activity and long life by first reducing a platinum (IV) salt in the form of an aqueous solution to the platinum (II) stage in the presence of the carrier by means of a selective reducing agent at a high chlorine ion concentration and at a pH value of 3 to 7, preferably 5, and then precipitating the platinum metal therefrom onto the carrier at a pH value of 2.3 to 4.0 by means of a strong reducing agent. This reduction to the metal now takes place, in spite of equally high concentrations of neutral salts, rapidly and completely. It is quantitative after about 2 hours.

As selective reducing agents which reduce platinum (IV) compounds just to the divalent stage there may be used, in a manner known per se, dithionites as for example sodium dithionites, and organic derivatives of dithionites, as for example the sodium salt of hydroxymethanesulfinic acid, or sulfurous acid and its compounds.

The amount of selective reducing agent to be added depends on the amount of platinum compound present in the tetravalent stage; i.e. the tetravalent platinum compounds present must first be reduced quantitatively to the divalent stage by means of the selective reducing agent before the metal is separated off.

The discovery that the stagewise reduction according to this invention proceeds rapidly and yields catalysts with excellent properties was surprising and not foreseeable. It is well known that when using reducing agents capable of reducing platinum compounds to metal, tetravalent platinum compounds are not reduced directly to metal, but pass more or less rapidly through the divalent stage, this usually being recognizable by changes in color in the reduction solution.

In the present case special care should be taken that there be no excess of the above-mentioned selective reducing agents present because otherwise divalent platinum sulfite complexes are formed. When subsequently reducting these sulfito complexes to metal, sulfur-containing catalysts are formed therefrom.

Reduction to the divalent stage takes place very rapidly.

As reducing agents for the conversion of the platinum (II) compounds thus obtained into metallic platinum, formic acid and its salts, such as sodium formate or calcium formate, are among those suitable.

The catalysts prepared or regenerated in the said way are considerably superior to the catalysts obtained, for example, from solutions of $H_2(PtCl_6)$, $H_2(PtCl_4(OH)_2)$ or platinum (IV) chloride by the direct action of formic acid or by the stagewise action of dithionite and formic acid. Catalysts of this high quality are only obtained from the said platinum solutions by the addition of hydrochloric acid or aqua regia, neutralization of the acid and subsequent stagewise reduction with for example dithionite and for example formic acid at the pH values specified above. This discovery is also new and was not to be foreseen.

The molar concentration of chlorine ions in the process according to this invention should be a multiple of the molar platinum concentration of the initial solution. A 20 to 50 fold concentration of $Cl^-$ ions with respect to the platinum concentration of the initial solution has proved to be especially suitable.

The aqua regia used for the regeneration of the catalyst is preferably of about 15% by volume strength. As buffer substances for the adjustment of the pH, acetates such as sodium acetate, calcium acetate or magnesium acetate, may be used.

The catalysts prepared according to the process according to this invention have proved to be far superior to the catalysts prepared by known methods when used in the catalytic hydrogenation of nitric oxide to hydroxylamine in the presence of dilute acids. They possess a high activity which remains constant for more than two months when the catalysts are used without interruption. Together with a fall in the costs for the regeneration of these catalysts, the capacity of a given plant for the catalytic production of hydroxylamine is at the same time considerably increased in this way.

The following examples will further illustrate this invention but the invention is not restricted to these examples.

Example 1

Fresh preparation of a catalyst by the direct reduction of platinum (IV) chloride solution to platinum metal.

80 kilograms of graphite powder are heated with 120 liters of water and 1 kilogram of platinum (IV) chloride (corresponding to 400 grams of platinum) to 80° C. while stirring and 3 kilograms of sodium acetate are added. By adding 5 liters of formic acid and maintaining a temperature of 80° C., the platinum is precipitated on the carrier at a pH value of about 2.8. This reaction is quantitative after about 5 hours. After the reaction has ended, the catalyst is filtered off and washed.

The catalyst thus obtained has an initial activity of 49 grams of NO per gram of platinum per hour in the synthesis of hydroxylamine. After continuous use for 50 days, the activity has fallen to about 31 grams of NO per gram of platinum per hour.

Example 2

Fresh production of a catalyst by the stagewise reduction of platinum (IV) chloride solution to platinum metal.

80 kilograms of graphite powder are heated with 110 liters of water, 7 liters of concentrated hydrochloric acid and 1 kilogram of platinum (IV) chloride to 80° C. while stirring. The suspension is then neutralized to pH 3.7 with sodium carbonate, and 3 kilograms of sodium acetate are added. The suspension then has the pH value 4.9. An aqueous solution of 2% by weight of sodium dithionite is then added to the suspension until it is just no longer possible to detect tetravalent platinum in the solution. By adding 5 liters of formic acid and maintaining a temperature of 80° C., the platinum is precipitated on the carrier at a pH value of about 2.8. This reaction is quantitative after about 2 hours. When the reduction is completed, the catalyst is filtered off and washed.

The catalyst thus obtained has an initial activity of 56 grams of NO per gram of platinum per hour in the synthesis of hydroxylamine. During the course of 65 days this activity decreases to 50 grams of NO per gram of platinum per hour.

Instead of the dithionite solution there may be used an aqueous solution of 2% by weight of the sodium salt of hydroxymethanesulfinic acid, or sodium sulfite, calcium bisulfite and sulfurous acid.

For the dissolution of the platinum hydrochloric acid may be used instead of aqua regia and as the oxidizing agent, chlorine gas or hydrogen peroxide may for example also be used.

The pH value during the reduction of the platinum (IV) compound to the platinum (II) compound preferably lies between 4 and 6.5. The pH value during the reduction to the metal preferably lies between the values 2.3 and 4.0. The temperature range of 70° to 100° C. is especially suitable as the reaction temperature. Salts of formic acid such as sodium formate or calcium formate may also be used instead of formic acid itself. The molar chlorine ion concentration of the platinum solution is preferably about 20 to 50 times the molar platinum concentration of the initial solution.

Example 3

Regeneration of a catalyst by the direct reduction of platinum (IV) chloride solution to platinum metal:

80 kilograms of a 0.5% platinum-graphite catalyst are treated with 60 liters of a 15% by volume aqua regia at a temperature of 80° C. for 12 hours. The whole of the platinum thereby goes into solution. The suspension thus obtained is diluted with about 60 liters of water, neutralized by adding sodium carbonate until the pH value is 4 and then 3 kilograms of sodium acetate are added. The suspension then has the pH value 5.2.

By adding 5 liters of formic acid and maintaining a temperature of 80° C., the platinum is precipitated on the carrier at a pH value of about 2.8. This reaction is quantitative after about 24 hours. When the reduction is ended, the catalyst is filtered off and washed.

In the synthesis of hydroxylamine from nitric oxide and hydrogen this catalyst has an initial activity of about 47 grams of NO per gram of platinum per hour. This activity declines during the course of 10 days to about 28 grams of NO per gram of platinum per hour.

Example 4

Regeneration of a catalyst by the stagewise reduction of platinum (IV) chloride solution to platinum metal:

80 kilograms of a 0.5% platinum-graphite catalyst are treated for 12 hours at a temperature of 80° C. with 60 liters of a 15% by volume aqua regia. The whole of the platinum thereby passes into solution. The suspension obtained is diluted with about 60 liters of water, neutralized to pH 4 by adding sodium carbonate and then 3 kilograms of sodium acetate are added. The suspension then has the pH value 5.2. A 3% by weight solution of sodium dithionite is then added until the exact moment when tetravalent platinum can no longer be detected in the solution. By adding 5 liters of formic acid and maintaining a temperature of 80° C., the platinum is precipitated on the carrier at a pH value of 2.8. This reaction is quantitative after about 2 hours. When the reduction is ended the catalyst is filtered off and washed.

If this catalyst is used in the synthesis of hydroxylamine from nitric oxide and hydrogen, it has an initial activity of about 58 grams of NO per gram of platinum per hour. During the course of 90 days this activity falls to about 47 grams of NO per gram of platinum per hour.

Instead of a dithionite solution, there may be used a 2% solution of the sodium salt of hydroxymethanesulfinic acid, or sodium sulfite, calcium bisulfite or sulfurous acid.

We claim:

1. A process for the production of platinum-carrier catalysts adapted for the synthesis of hydroxylamine from nitric oxide and hydrogen in the presence of dilute mineral acids, wherein a platinum (IV) salt selected from the group consisting of platinum (IV) chloride, chloroplatinic acid and $H_2(PtCl_4(OH)_2)$ is first reduced in the form of an aqueous solution to the platinum (II) stage with a catalyst carrier in said solution at a molar chlorine ion concentration of from 20 to 50 times the molar platinum concentration of the said solution and at a pH value of 4.0 to 6.5 by means of a compound selected from the group consisting of sodium dithionite, organic derivatives of sodium dithionite, sodium sulfite, calcium bisulfite and sulfurous acid, and in the solution thus obtained the platinum (II) is then reduced to precipitate platinum metal on the carrier at a pH value of 2.3 to 4.0 by means of a reducing agent selected from the group consisting of formic acid, sodium formate and calcium formate.

2. A process for the production of platinum-carrier catalysts adapted for the synthesis of hydroxylamine from nitric oxide and hydrogen in the presence of dilute mineral acids, wherein a platinum (IV) salt in the form of an aqueous solution obtained by dissolving platinum in 15% by volume aqua regia is first reduced to the platinum (II) stage with a catalyst carrier in said solution at a molar chlorine ion concentration of from 20 to 50 times the molar platinum concentration of the said solution and at a pH value of 4.0 to 6.5 by means of a compound selected from the group consisting of sodium dithionite, organic derivatives of sodium dithionite, sodium sulfite, calcium bisulfite and sulfurous acid, and in the solution thus obtained the platinum (II) is then reduced to precipitate platinum metal on the carrier at a pH value of 2.3 to 4.0 by means of a reducing agent selected from the group consisting of formic acid, sodium formate and calcium formate.

3. A process for the production of platinum-carrier catalysts adapted for the synthesis of hydroxylamine from nitric oxide and hydrogen in the presence of dilute mineral acids, wherein a platinum (IV) salt selected from the group consisting of platinum (IV) chloride, chloroplatinic acid and $H_2(PtCl_4(OH)_2)$ is first reduced in the form of an aqueous solution to the platinum (II) stage with a catalyst carrier in said solution at a molar chlorine ion concentration of from 20 to 50 times the molar platinum concentration of the said solution at a pH value of 4.0 to 6.5 by means of a compound selected from the group consisting of sodium dithionite, organic derivatives of sodium dithionite, sodium sulfite, calcium bisulfite and sulfurous acid, and in the solution thus obtained the platinum (II) is then reduced to precipitate platinum metal on the carrier at a pH value of 2.3 to 4.0 by means of a reducing agent selected from the group consisting of formic acid, sodium formate and calcium formate, the pH values being adjusted by using an acetate selected from group consisting of sodium acetate, calcium acetate and magnesium acetate as a buffer substance.

4. A process for the production of platinum-carrier catalysts adapted for the synthesis of hydroxylamine from nitric oxide and hydrogen in the presence of dilute mineral acids, wherein a platinum (IV) salt in the form of an aqueous solution obtained by dissolving platinum in a 15% by volume aqua regia is first reduced to the platinum (II) stage with a catalyst carrier in said solution at a molar chlorine ion concentration of from 20 to 50 times the molar platinum concentration of the said solution and at at a pH value of 4.0 to 6.5 by means of a compound selected from the group consisting of sodium dithionite, organic derivatives of sodium dithionite, sodium sulfite, calcium bisulfite and sulfurous acid, and in the solution thus obtained the platinum (II) is then reduced to precipitate platinum metal on the carrier at a pH value of 2.4 to 4.0 by means of a reducing agent selected from the group consisting of formic acid, sodium formate and calcium formate, the pH values being adjusted by using an acetate selected from the group consisting of sodium acetate, calcium acetate and magnesium acetate as a buffer substance.

References Cited in the file of this patent

UNITED STATES PATENTS

| | | |
|---|---|---|
| 2,285,277 | Henke et al. | June 2, 1942 |
| 2,834,730 | Johnson et al. | May 13, 1958 |

UNITED STATES PATENT OFFICE

CERTIFICATE OF CORRECTION

Patent No. 3,060,133            October 23, 1962

Kurt Jockers et al.

It is hereby certified that error appears in the above numbered patent requiring correction and that the said Letters Patent should read as corrected below.

Column 2, line 47, for "puropse" read -- purpose --; column 3, line 24, for "tetramminoplantinum" read -- tetramminoplatinum --; column 5, line 45, for "and" read -- or --; column 7, line 16, before "group" insert -- the --; column 8, line 11, for "2.4" read -- 2.3 --.

Signed and sealed this 3rd day of September 1963.

(SEAL)
Attest:

ERNEST W. SWIDER
Attesting Officer

DAVID L. LADD
Commissioner of Patents